(No Model.)
L. F. MILLER.
PLANTER.
No. 544,184. Patented Aug. 6, 1895.
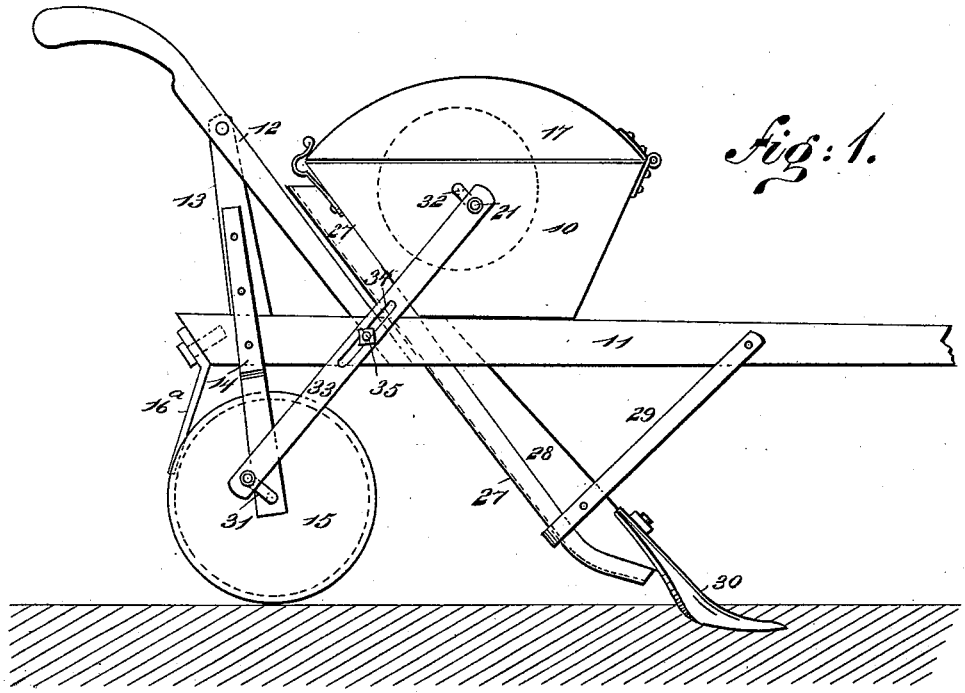
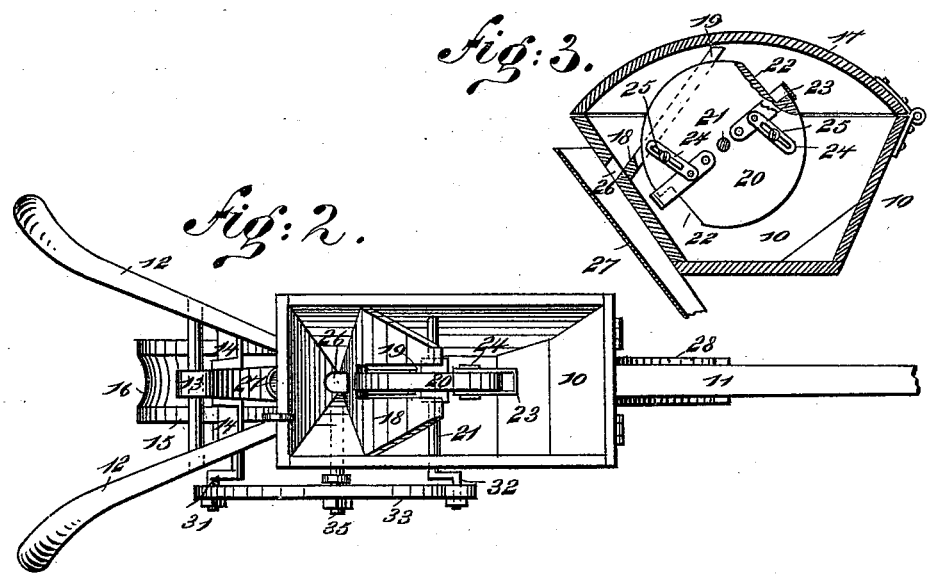
WITNESSES:
INVENTOR
L. F. Miller
BY
Munn & Co
ATTORNEYS.

UNITED STATES PATENT OFFICE.

LEWIS F. MILLER, OF CANTON, NORTH CAROLINA.

PLANTER.

SPECIFICATION forming part of Letters Patent No. 544,184, dated August 6, 1895.

Application filed October 23, 1894. Serial No. 526,702. (No model.)

*To all whom it may concern:*

Be it known that I, LEWIS F. MILLER, of Canton, in the county of Haywood and State of North Carolina, have invented a new and useful Improvement in Planters, of which the following is a full, clear, and exact description.

My invention relates to an improvement in planters, and it has for its object to provide a planter which will be simple and durable in construction, comprising but few parts, the planter being so constructed as to open a furrow, drop the seed therein, and fertilizer likewise, if necessary, and cover the seed.

Another object of the invention is to provide a seed-wheel in which the pockets may be rendered large or small, as occasion may demand, the adjustment being accomplished in an exceedingly expeditious and convenient manner.

The invention consists in the novel construction and combination of the several parts, as will be hereinafter fully set forth, and pointed out in the claim.

Reference is to be had to the accompanying drawings, forming a part of this specification, in which similar figures of reference indicate corresponding parts in all the views.

Figure 1 is a side elevation of the planter. Fig. 2 is a plan view thereof, the cover of the seed-box being removed; and Fig. 3 is a vertical section through the seed-box.

In carrying out the invention the seed-box 10, which may be of any approved shape, is secured upon a beam 11, said beam at its forward end being provided with a clevis, or the equivalent thereof. (Not shown.) Handles 12 are secured to the rear portion of the beam, being braced by a standard 13, which extends upward from the rear portion of the said beam, and bearings 14 are projected downward from the rear extremity of the beam, adapted as supports for a covering-wheel 15, said wheel being provided with a peripheral groove 16, as shown in Fig. 2.

A scraper 16a is likewise secured to the beam, and extends downward to an engagement with the grooved portion of the wheel for the purpose of keeping the groove clear of dirt. The seed-box is provided with a top 17 and with a transverse partition 18, located preferably near its rear end, and extending from the body of the box at a point between the top and bottom in an upwardly and forwardly direction. A slot or opening 19 is made in this partition, as shown in Figs. 2 and 3, and a portion of the periphery of the seed-wheel 20 extends through this slot in the partition, the wheel being mounted upon a shaft 21, journaled in the body of the box.

The seed-wheel is provided with a series of peripheral pockets, and these pockets are ordinarily made by forming in the periphery of the wheel-recesses 22 at predetermined intervals apart. These recesses have their inner and longer walls tangential to the periphery of the wheel, the shorter or under walls being preferably at a right angle to the bottom walls, the recesses having the two walls only.

A yoke-strap 23 is pivoted to the wheel at the inner extremities of its members, and a strap is located at each of the recesses. The straps are made to straddle the wheel, the bow portion thereof hugging closely to the periphery; but the straps may be moved to or from the open end of a recess, and in this manner form a pocket of greater or less size. The adjustment of the yoke or bow straps is accomplished by pivoting to each strap a link 24 and securing said link to the wheel by means of a set-screw 25.

At the bottom of the partition 18 an opening 26 is made in the back portion of the seed-box, as is best shown in Fig. 3. This opening leads directly into a chute 27, and the said chute is carried downward along the rear wall of the box upon its interior and in a forwardly direction to a point near the ground, the lower portion of the chute being strengthened by a beam or bar 28, and the strap, together with the beam or bar, is rendered steady at its lower end by a brace 29, substantially encircling the chute and its bar and attached to the beam 11.

The chute delivers its seed immediately back of a share or blade 30, adapted as a furrow-opener, the said share or blade extending downward in a forwardly direction from the beam 28, to which it is secured, and the lower end of the share is at an angle to the body, the share being somewhat convexed in cross-section upon its forward face.

The seed-wheel is driven from the covering-wheel 15, and a crank-arm 31 is formed upon one end of the shaft or trunnion of the seed-wheel, while a corresponding crank 32 is produced upon the corresponding end of the seed-wheel shaft 21. These two cranks are pivotally connected by a bar or pitman 33, the said bar or pitman being provided with a longitudinal slot 34, receiving a pin 35, which is secured to the beam and extends through the said slot, and the pin is preferably provided with a friction-roller where the pitman engages with it.

In the operation of the machine, as said machine is drawn forward the seed-wheel is revolved, and the seed taken up by the pockets will be dropped upon the rear face of the partition 18 and will fall into the chute 27 through the opening 26. Meanwhile the furrow will be opened by the share 30 and the seed will be delivered into the furrow, the earth falling in upon the seed and covering it as the machine advances. The covering-wheel 15 follows in the track of the plow-share and insures the earth being properly covered over the seed, and likewise ridges the earth owing to the groove 16 in the periphery of the wheel.

This machine will plant upon a hill side or upon uneven ground as readily as upon smooth soil, and it is evident also that two or more wheels may be placed in the seed-box and mounted on the same shaft, in which event partitions are made in the body of the box to provide a compartment for each wheel, and fertilizer may be placed in one or two of the compartments and seed in the others, both the seed and the fertilizer being delivered to the same chute 27.

The machine is exceedingly simple and durable in its construction, its operation may be readily understood by any person of ordinary intelligence, and there need be no castings. Consequently there will be but little danger of breakage. The parts may likewise be duplicated by any mechanic should they become worn.

Having thus described my invention, I claim as new and desire to secure by Letters Patent—

In a planter, a seed-wheel having recesses in its periphery, each recess having one side arranged radially of the wheel and having its other side arranged at right angles to said radial side, straps each bent to a U-shape with their ends secured to opposite sides of the seed-wheel adjacent to one of said recesses, whereby pockets are formed, the bottoms of said pockets being formed by the radial sides of the recesses, slotted links secured to the straps and set screws passing through the slots of the links and screwing into the seed-wheels, substantially as set forth.

LEWIS F. MILLER.

Witnesses:
JOS. A. MAY,
JOHN D. HOLTSCLAW.